(12) United States Patent
Kloepfer et al.

(10) Patent No.: US 12,518,334 B1
(45) Date of Patent: Jan. 6, 2026

(54) SYSTEMS AND TECHNIQUES FOR MANAGING INCIDENT DATA

(71) Applicant: Biofire Technologies Inc., Broomfield, CO (US)

(72) Inventors: Kai Thorin Kloepfer, Denver, CO (US); Bryan Edward Rogers, Aurora, CO (US)

(73) Assignee: Biofire Technologies Inc., Broomfield, CO (US)

( * ) Notice: Subject to any disclaimer, the term of this patent is extended or adjusted under 35 U.S.C. 154(b) by 251 days.

(21) Appl. No.: 18/500,897

(22) Filed: Nov. 2, 2023

Related U.S. Application Data

(60) Provisional application No. 63/382,338, filed on Nov. 4, 2022.

(51) Int. Cl.
*G06Q 50/26* (2024.01)
*G06F 7/08* (2006.01)
*G06F 21/60* (2013.01)

(52) U.S. Cl.
CPC ............ *G06Q 50/265* (2013.01); *G06F 7/08* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 9,752,840 B1* | 9/2017 | Betro | H04W 4/029 |
| 2010/0198858 A1* | 8/2010 | Edwards | G06Q 50/26 |
| | | | 707/769 |
| 2015/0177363 A1* | 6/2015 | Hermann | G01S 5/20 |
| | | | 367/118 |
| 2016/0232774 A1* | 8/2016 | Noland | G08B 25/10 |
| 2017/0337513 A1* | 11/2017 | Dimino, Jr. | F42B 35/00 |
| 2024/0210136 A1* | 6/2024 | Satten | H04W 4/38 |

* cited by examiner

*Primary Examiner* — Eddy Cheung
(74) *Attorney, Agent, or Firm* — Perkins Coie LLP; Andrew T. Pettit

(57) ABSTRACT

The present disclosure provides systems and techniques for generating incident reports. A device, such as a remote device, may receive data including multiple data fields, where a first data field contains a first data value uniquely identifying a gun, and where a second data field contains a second data value identifying a gunshot event. The device may process the data to determine i) a location of the gunshot event and ii) a time of the gunshot event. The device may generate an incident report based on the data, where the incident report indicates a use of force incident, the location of the gunshot event, and the time of the gunshot event. The device may encrypt the incident report using an encryption key to produce an encrypted version of the incident report, and the device may store the encrypted version of the incident report in a database.

20 Claims, 13 Drawing Sheets

SYSTEMS AND TECHNIQUES FOR MANAGING INCIDENT DATA

CROSS-REFERENCE TO RELATED APPLICATIONS

This application claims priority to U.S. Provisional Application No. 63/382,338, titled "SYSTEMS AND TECHNIQUES FOR MANAGING INCIDENT DATA" and filed on Nov. 4, 2022, which is incorporated by reference herein in its entirety.

FIELD OF TECHNOLOGY

The teachings disclosed herein generally relate to guns, and more specifically to collecting incident data and generating incident reports.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support collecting incident data for use in incident reports. The systems and techniques described herein also support generating incident reports. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the systems and techniques described herein support collecting data for use in incident reports and generating incident reports. For example, a remote device may obtain, from a data collection device, data including gun identification data and incident data, where the gun identification data uniquely identifies a gun, and where the incident data indicates a type of incident. The remote device may process the data to determine, based on the gun identification data, an operator assigned to the gun, and the remote device may generate a incident report based on the data, where the incident report indicates the type of incident and the operator assigned to the gun.

Figure 1:
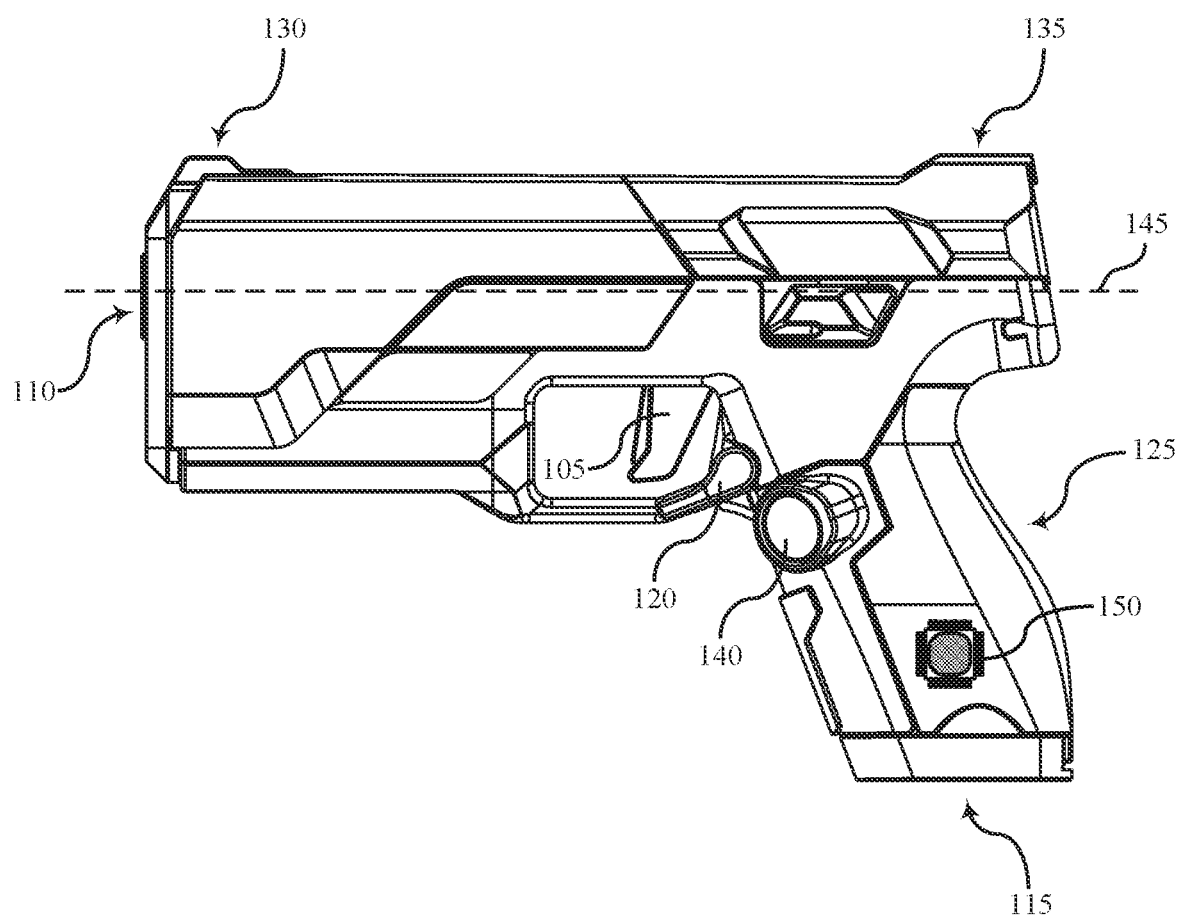
FIG. 1 illustrates an example of a gun that supports collecting incident data.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Law enforcement personnel respond to calls for service on a regular basis, and a seemingly peaceful encounter can rapidly turn violent. As such, most law enforcement personnel are equipped with guns so that they can protect not only themselves, but also the public at large. Most law enforcement personnel carry conventional firearms so as to be able to respond to situations that may require lethal force, and law enforcement personnel are expected to not only terminate violent threats but are also expected to generate accurate and detailed documentation of the encounter. Generating an accurate report is exceptionally difficult when the associated events unfold rapidly in a tremendously high-stress environment.

Recalling aspects of a stressful call for service is a difficult endeavor, and even those who are highly trained often fail to recall all aspects of such calls for service with perfect accuracy. Additionally, multiple officers may respond to a call for service, so the recollection of any one officer lacks the perspective of the other officers. As such, systems and techniques for improving data collection and report generation are desired.

Introduced here, therefore, are systems and techniques for collecting incident data and generating incident reports. A call for service is an example of an incident, and one or more law enforcement officials may respond to a call for service. A data collection device may be carried on the person of law enforcement official, and the data collection device may collect data in response to an event (e.g., firing a gun, calling for backup, pressing a button, a call for service, etc.). For example, a law enforcement individual may respond to a call for service and the data collection device may collect data associated with the call for service and store the data with an identifier indicating that the data is associated with the call for service. In some examples, the data may be stored locally in memory of the data collection device, while in some other examples, the data may be stored at a remote device, such as a remote database.

The remote device may obtain incident data and generate an incident report based on the incident data. The remote device may generate an incident report on a reoccurring basis (e.g., every day, every month, etc.), or the remote device may generate an incident report in response to a user-input, such as an administrator clicking a report generation button of a user-interface. An incident report may contain information for one or more incidents, and an incident may include data obtained from one or more data collection devices. For example, an incident report may be generated for a call for service that had one responding officer and the incident report may include incident data collected by the data collection device possessed by the one responding officer. As another example, an incident report may be generated for a call for service that had multiple responding officers and the incident report may include incident data collected by the multiple data collection devices possessed by the multiple responding officers.

Embodiments may be described in the context of executable instructions for the purpose of illustration. For example, a processor housed in a gun may be described as being capable of executing instructions that permit the device to collect and store data related to an event. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports collecting incident data. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint scanner (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to described data that is used to authenticate a user. For example, the gun 100 may collect authentication data from the user to determine that the user is authorized to operate the gun 100, and the gun 100 may be unlocked based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may include a data collection device 150 embedded in the grip, but it should be understood that the data collection device 150 may be located elsewhere in the gun 100, the data collection device 150 may be affixed to the gun 100, or the data collection device may be separate from the gun 100. The data collection device 150 supports collecting data, and the data collection device 150 may, in some examples, include a wireless communication interface. The data collection device 150 may support the collection of various types of data, such as acceleration data, location data, timestamp data, gun identification data, operator identification data, holstering data, firing data, ammunition data, or the like.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights-namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The data collection device 150 may identify an incident, such as a call for service incident or a use of force incident, and the data collection device 150 may collect incident data in response to identifying the incident. The data collection device 150 may collect multiple types of data, such as location data (e.g., global positioning system (GPS) data) and audio/video (AV) data. For example, in response to identifying the incident, the data collection device 150 may cause a camera to record AV data and cause a GPS sensor to record a series of data points as the camera is recording. The data collection device 150 may cause the camera and GPS sensor to terminate recording data in response to identifying a termination event, such as an operator pressing a button or expiration of a timer.

The data collection device 150 may identify a gunshot event based on an analysis of acceleration data, where a data value of the acceleration data satisfies an acceleration threshold. The acceleration data may be generated by an accelerometer of the gun 100, or the acceleration data may be generated by an aspect of the data collection device 150. The data collection device 150 may generate data including gun identification data and incident data, where the gun identification data uniquely identifies the gun 100, and where the incident data contains a timestamp indicating a time at which the gunshot event occurred. As an example, the gun identification data may include a serial number that uniquely identifies the gun 100. The data collection device 150 may encrypt the data using a cryptographic key to produce an encrypted version of the data, and the data collection device 150 may transmit the encrypted version of the data to a remote device. As an example, the remote device may be a data server, a desktop computer, a data store, a smartphone, a tablet, or the like.

Figure 2:
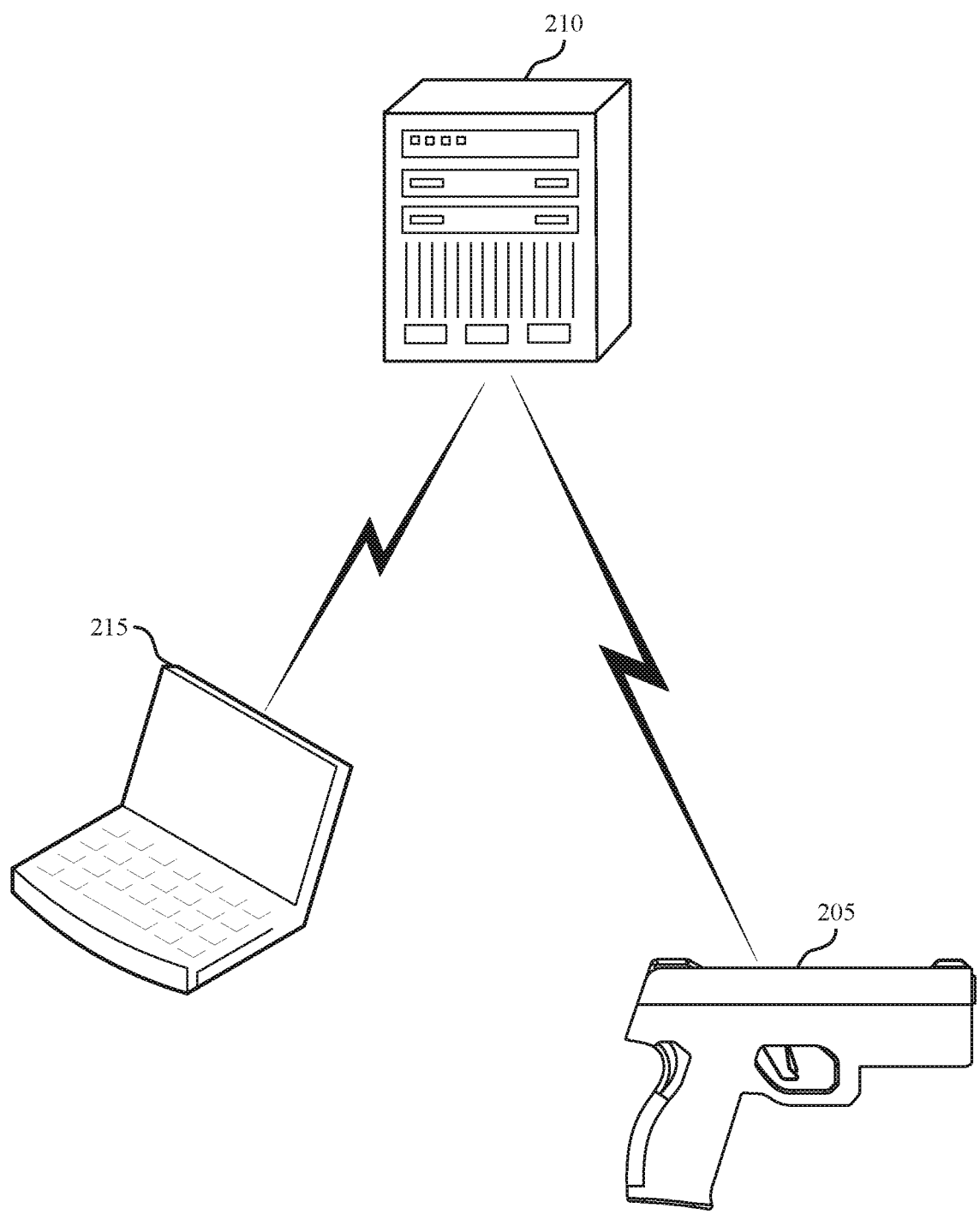
FIG. 2 illustrates an example of a system that supports using incident data to generate an incident report.

FIG. 2 illustrates an example of system 200 that supports using incident data to generate an incident report. The gun 205 may include or be coupled with a device that is capable of collecting data, such as location data, timestamp data, acceleration data, visual data, audio data, distance data, or the like. The device may collect data in response to an event, such as an officer indicating that the officer is responding to a call for service, and the device may transmit the collected data to the remote device 210. The device may transmit the data to the remote device over a virtual communication channel, such as a radio frequency spectrum.

The remote device 210 may be an example of a computing device, such as a server, computer, a smartphone, a database, or the like. The remote device 210 may process store data, process data, and transmit data the user device 215. The user device 215 may display an incident report.

Figure 3:
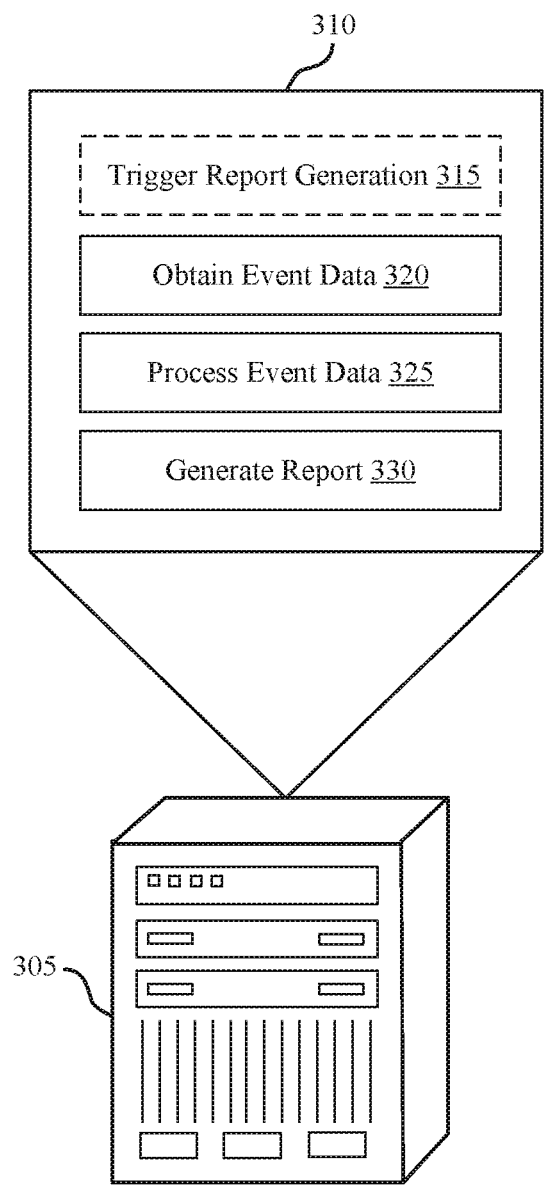
FIG. 3 illustrates an example of a procedure for generating an incident report.

FIG. 3 illustrates an example of a procedure 310 for generating an incident report. The procedure 310 may be performed by a device 305, such as a server or a computer.

The device 305 may be referred to as a remote device, and the device 305 may include a communication interface that supports the device 305 in communicating with other devices. For example, the device 305 may support electronic communication with computers and devices or guns that include wireless communication interfaces.

At step 315, the device 305 may be triggered to generate an incident report. The device 305 may generate an incident report in response to a trigger event, such as receiving user-input, a Cron job, receiving data from a data collection device, or the like.

At step 320, the device 305 may obtain event data. The device 305 may receive the event data from a data collection device, or the device 305 may retrieve the event data from a database implemented on the device 305 or on a device that is separate from the device 305.

At step 325, the device 305 may process the event data, and the device 305 may generate an incident report at step 330. The device 305 may process the event data based on based on an incident report configuration, based on user-input, or based on the type of data included in the event data. As an example, a user may provide user-input indicating that an incident report is to be generated for an incident associated with a unique identifier (e.g., a call for service, a case number, etc.). The user may enter or select the unique identifier, the device 305 may receive an indication of the unique identifier, and the device 305 may extract data associated with the unique identifier from the event data. In some examples the event data may be associated with one data collecting device, while in some other examples the event data may be associated with multiple data collecting devices.

The event data may include data for multiple events and the device 305 may process the event data to extract data for a particular event. For example, the event data may include an incident identifier metadata field and the device 305 may process the event data to extract the data that is associated with incident identifier.

The event data may include data spanning multiple days and the device 305 may process the event data to extract data for a particular timespan. For example, the event data may include a timestamp metadata field and the device 305 may process the event data to extract the data that is within the timespan.

Figure 4:
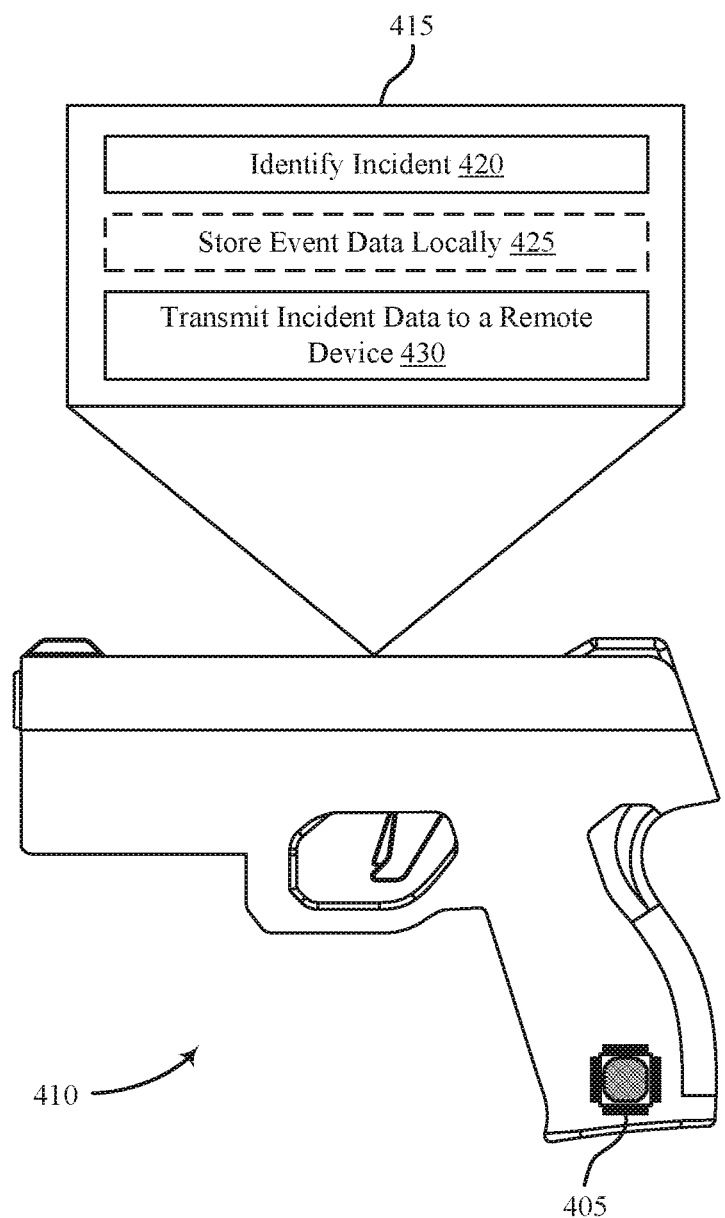
FIG. 4 illustrates an example of a data collection device that is coupled with a gun.

FIG. 4 illustrates an example of a data collection device 405 that is coupled with a gun 410. In some examples, the data collection device may be embedded in, or affixed to, the gun 410, while in some other examples, the data collection device may be separate from the gun 410. The data collection device 405 may perform a data collection procedure 415.

The data collection device may identify an incident at step 420, and the data collection device 405 may collect incident data in response to the identifying the incident. In some examples, at step 425, the data collection device 405 may store the incident data in memory. At step 430, the data collection device 405 may transmit the incident data to a remote device. As an illustrative example, the data collection device 405 may identify a gunshot incident based on measuring acceleration that satisfies an acceleration threshold, and the data collection device 405 may collect data in response to the identifying the gunshot incident. As another example, the data collection device 405 may receive a message from a remote dispatcher device assigning the data collection device 405 to an incident (e.g., a call for service), and the data collection device 405 may collect data in response to the receiving the message.

The data collection device 405 may collect various types of data in response to an incident. For example, the data collection device 405 may collect timestamp data (e.g., via a clock), location data (e.g., via a GPS sensor), visual data (e.g., via a camera), audio data (e.g., via a microphone), or the like. The data collection device 405 may associate the collected data with a unique identifier indicating the incident, and the data collection device 405 may store the collected data in local memory and/or transmit the collected data to a remote device. As an example, the data collection device 405 may populate an incident identifier metadata field with a data value that identifies the incident.

In some examples, the data collection device 405 may associate the collected data with a unique identifier indicating the gun 410 and/or the operator of the gun 410 at the time of the incident. As an example, the data collection device 405 may populate a gun identifier metadata field with a data value that identifies the gun 410. For example, the data collection device 405 may populate the gun identifier metadata filed with the serial number of the gun 410. As another example, the data collection device 405 may populate an operator identifier metadata field with a data value that identifies the operator of the gun 410. The data collection device 405 may determine the data value that identifies the operator of the gun 410 based on a check out procedure indicating the operator of the gun 410 or based on a user authentication procedure indicating the operator of the gun 410.

The data collection device 405 may, in some cases, generate a cryptographic proof of identify and transmit the proof of identify the remote device. A proof of identify may be used to prove the data collection device 405 and/or the gun 410 that collected the incident data. For example, the data collection device may generate a digital signature and transmit the digital signature with the incident data to the remote device. A digital signature may be generated by encrypting data using a private key of an asymmetric cryptographic key pair, and the digital signature may be verified by decrypting the data using a public key of the asymmetric cryptographic key pair. The data collection device 405 may additionally or alternatively generate a hash value and transmit the hash value with the incident data to the remote device, and the hash value may be used to verify at a later point in time that all the incident data has not been altered changed. Generating a digital signature and/or a hash value can improve data security and integrity, as a digital signature can be used to cryptographically show that the data collection device 405 transmitted the incident data, and the hash value can be used to cryptographically show that the incident data has not been tampered with. Incident data may, in some cases, be used as evidence, and the use of digital signatures and/or hash values can be used to show data authenticity and chain of custody.

Figure 5:
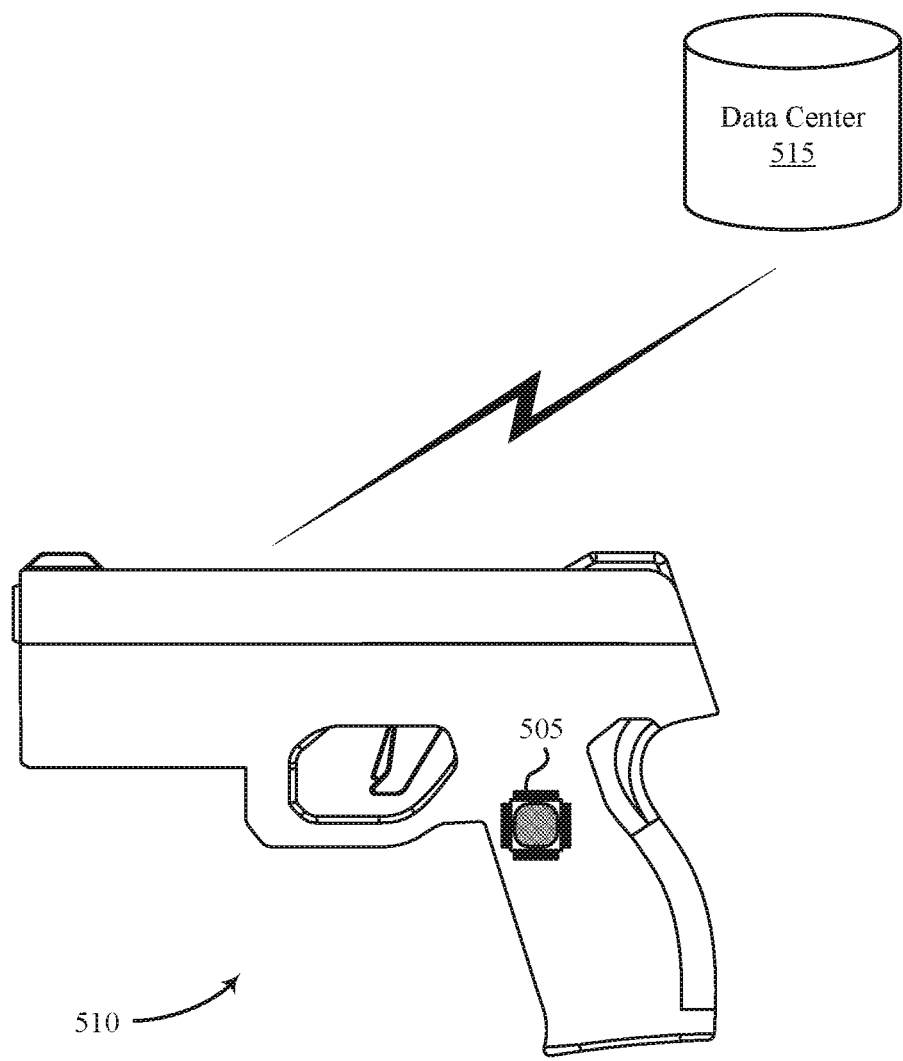
FIG. 5 illustrates examples of a data collection device that is capable of collecting incident data.

FIG. 5 illustrates an example of a data collection device 505 that is capable of collecting incident data. The data collection device 505 may be coupled with the gun 510, and the data collection device may be capable of communicating with the data center 515. The data center 515 is an example of a remote device that is capable of communicating with the data collection device 505.

The data collection device 505 may communicate with the data center 515 via a wireless communication channel, and the data collection device 505 may communicate with the data center 515 according to a wireless communication protocol. In some examples, the data collection device 505 may communicate with the data center 515 in the licensed electromagnetic spectrum. For example, the data collection device 505 may transmit messages to the data center 515 within allocated frequency bands. In some other examples, the data collection device 505 may communicate with the data center 515 in the unlicensed electromagnetic spectrum. For example, the data collection device 505 may transmit messages to the data center 515 by performing a listen-before-talk (LBT) procedure. In some examples, the data collection device 505 and the data center 515 may communicate according to a wireless communication standard, such as 3G, 4G, 5G, Wi-Fi, Zigbee, or the like.

Figure 6:
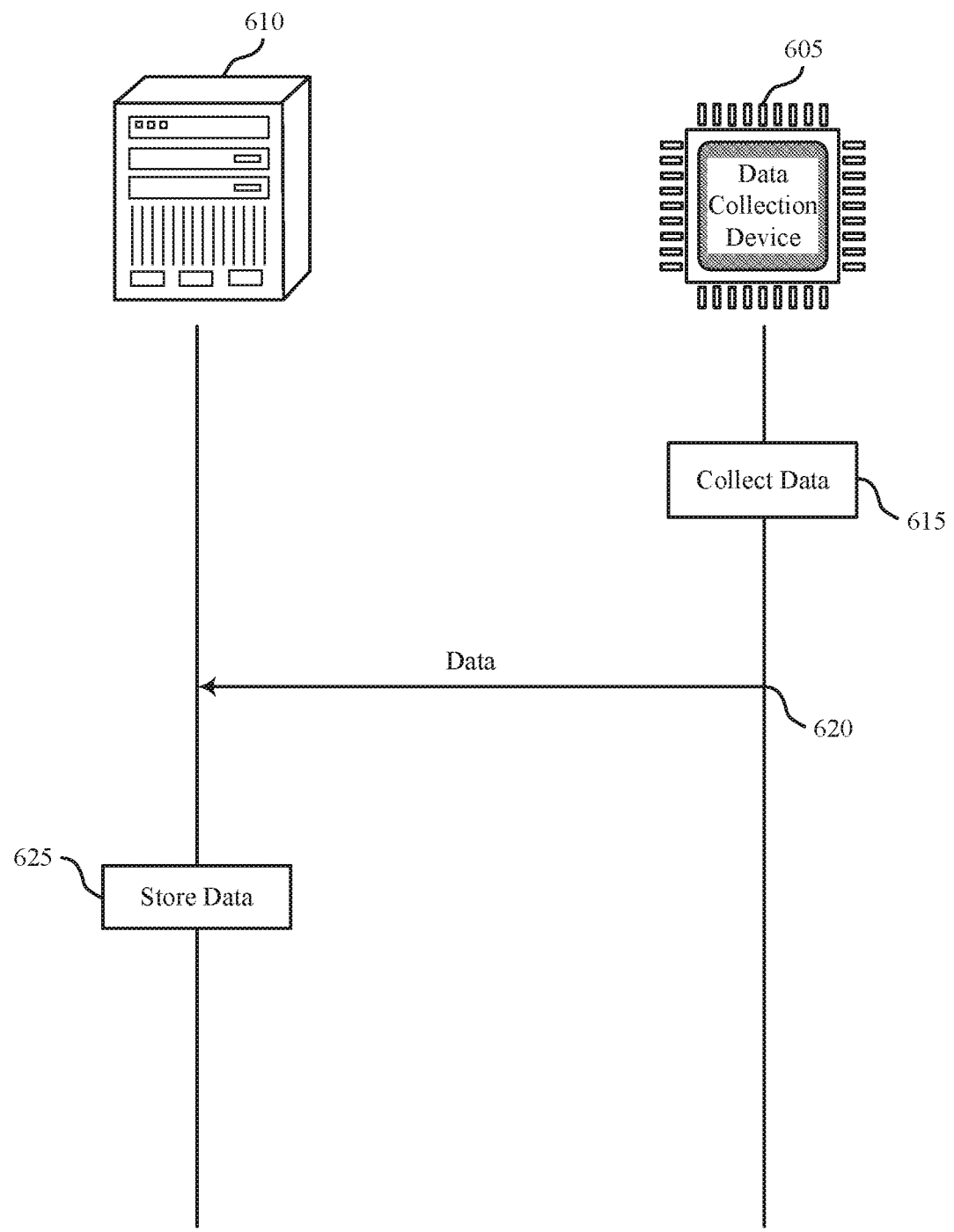
FIG. 6 illustrates an example of a process flow for collecting incident data.

FIG. 6 illustrates an example of a process flow 600 for collecting incident data and transmitting the incident data to a remote device. The data collection device 605 is capable of collecting incident data which may include location data, time data, officer identification data, gun identification data, acceleration data, visual data, audio data, or the like. The data collection device 605 may be embedded in a gun, affixed to a gun, or separate from a gun. The remote device 610 is capable of receiving and storing incident data. In some examples, the remote device 610 may be a network-connected device that is capable of transmitting and receiving data in a wireless manner. Alternative examples of the following may be implemented, where some steps are performed in a different order than described or are not performed at all. In some cases, steps may include additional features not mentioned below, or further steps may be added.

At step 615, the data collection device 605 may collect incident data. The data collection device 605 may collect incident data in response to identifying an incident. The data collection device 605 may identify an incident based on receiving a message from a remote device (e.g., the remote device 610 or an alternative remote device), based on determining that a gunshot has been fired (e.g., by measuring an acceleration that satisfies an acceleration threshold), based on determining that a gun has been unholstered (e.g., by identifying an output generated by the holster to indicate that the gun has been unholstered), based on a user action (e.g., removing a safety, pressing a button, racking a round into the chamber, drawing the gun from the holster, etc.), or the like.

In some examples, the data collection device 605 may collect incident data for a predetermined amount of time or until a termination event has been identified. For example, the data collection device 605 may start collecting incident data in response to identifying an incident and stop collecting incident data in response to identifying a termination event, such as an operator pressing a button, the gun being placed in a holster, the data collection device 605 receiving a termination message, or the like. The data collection device may record data over multiple periods of time while maintaining chronology such that a period of time can be reviewed and a person analyzing the period of time can not only view the data that was recorded but also when the data was recorded.

At step 620, the data collection device 605 may transmit the incident data to the remote device 610. In some examples, the data collection device 605 may encrypt the incident data and transmit the encrypted incident data to the remote device. The data collection device 605 may generate a digital signature and transmit the digital signature to the remote device 610.

At step 625, the remote device 610 may store the incident data. The remote device 610 may store the incident data in non-volatile memory, and the incident data may be stored in encrypted form. In some examples, the incident data may be encrypted using multiple encryption keys such that possession of the multiple keys is needed to decrypt the incident data.

Figure 7:
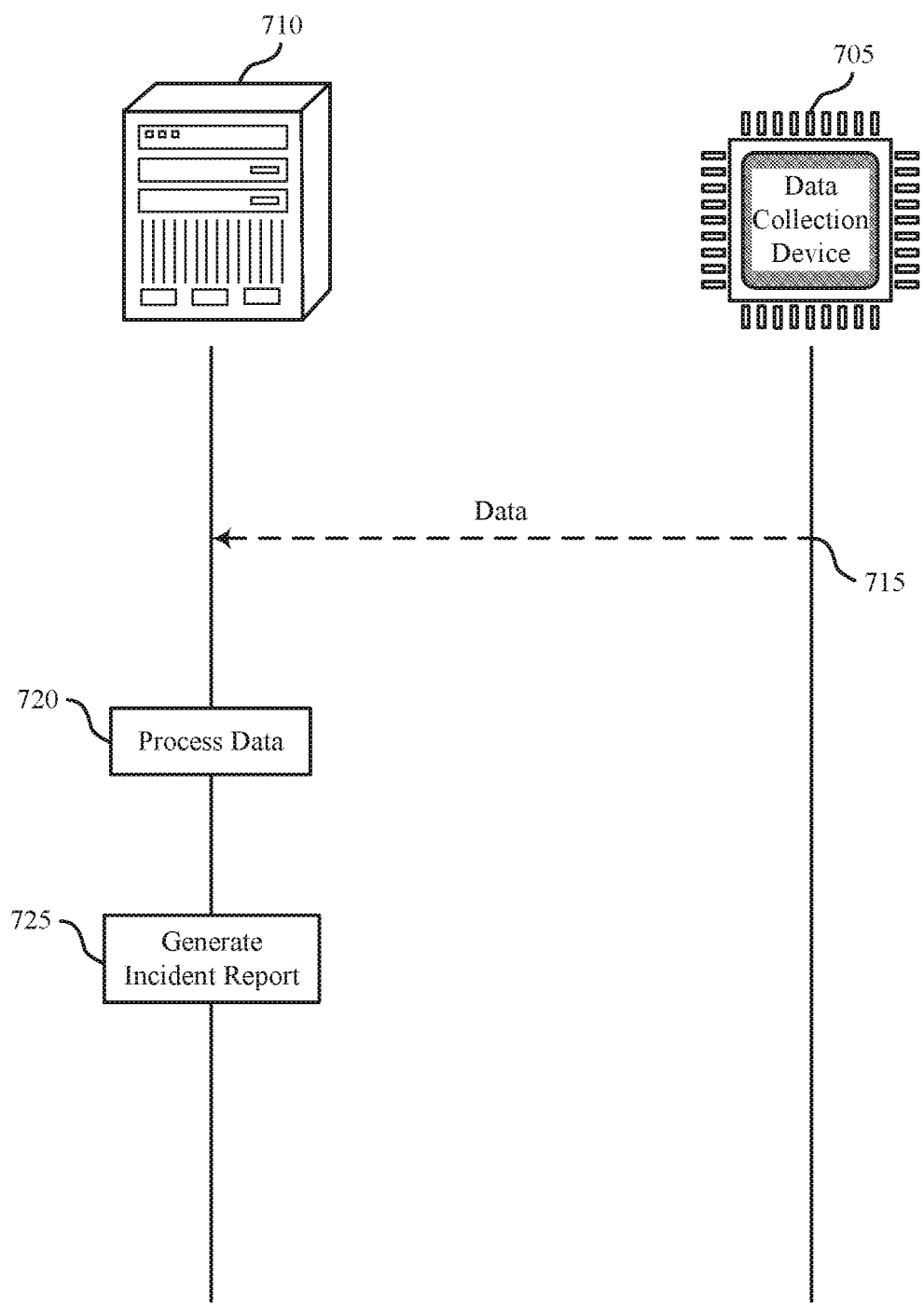
FIG. 7 illustrates an example of a process flow for generating an incident report.

FIG. 7 illustrates an example of a process flow 700 for generating an incident report. The data collection device 705 is capable of collecting incident data, and the data collection device 705 may be embedded in a gun, affixed to a gun, or separate from a gun. The remote device 710 is capable of receiving incident data, and the remote device 710 may be a network-connected device that is capable of transmitting and receiving data in a wireless manner. Alternative examples of the following may be implemented, where some steps are performed in a different order than described or are not performed at all. In some cases, steps may include additional features not mentioned below, or further steps may be added.

At step 715, the remote device 710 may receive incident data from the data collection device 705. The remote device 710 may additionally or alternatively retrieve incident data from a data store, such as a relational database or a non-relational database.

At step 720, the remote device 710 may process incident data. In some examples, the remote device 710 may process data to extract data related to an indicated incident, and the processed data may be used in an incident report. For example, the remote device 710 may receive an indication of an incident (e.g., a operator may select or enter an incident identifier, such as a sequence of characters that represents the incident), and the remote device 710 may identify data that is associated with the indicated incident. As an illustrative example, an operator may select an incident identifier representing a use of force event within a user-interface, and the remote device 710 may identify data that is associated with the use of force event. The data associated with the use of force event may have been generated by a single data collection device, or the data associated with the use of force event may have been generated by multiple data collection devices. For example, the data may have been generated by a single data collection device when one officer responded to the use of force event, and the data may have been generated by multiple data collection devices when multiple officers responded to the use of force event.

At step 725, the remote device 710 may generate an incident report. The incident report may be generated such that a human operator can review the report. In some examples, the incident report may include data associated with an incident selected by the operator. In some examples, the incident report may be generated based on a configuration created by the operator via a user-interface. As an illustrative example, the operator may use the user-interface to indicate that the remote device 710 is to generate an incident report for a call for service incident and the remote device 710 may generate an incident report that illustrates the chronology of events that took place as the officer was responding to the call for service. In some examples, the operator may indicate whether body worn camera footage should be included in the report. For example, the user-interface may include a check box (or "radio button") for body worn camera footage and the remote device 710 may include camera footage related to the call for service incident when the check box is selected, and the remote device 710 may not include camera footage related to the call for service incident when the check box is not selected. The incident report may be presented via a web application, a desktop application, a mobile application, or the like.

Figure 8:
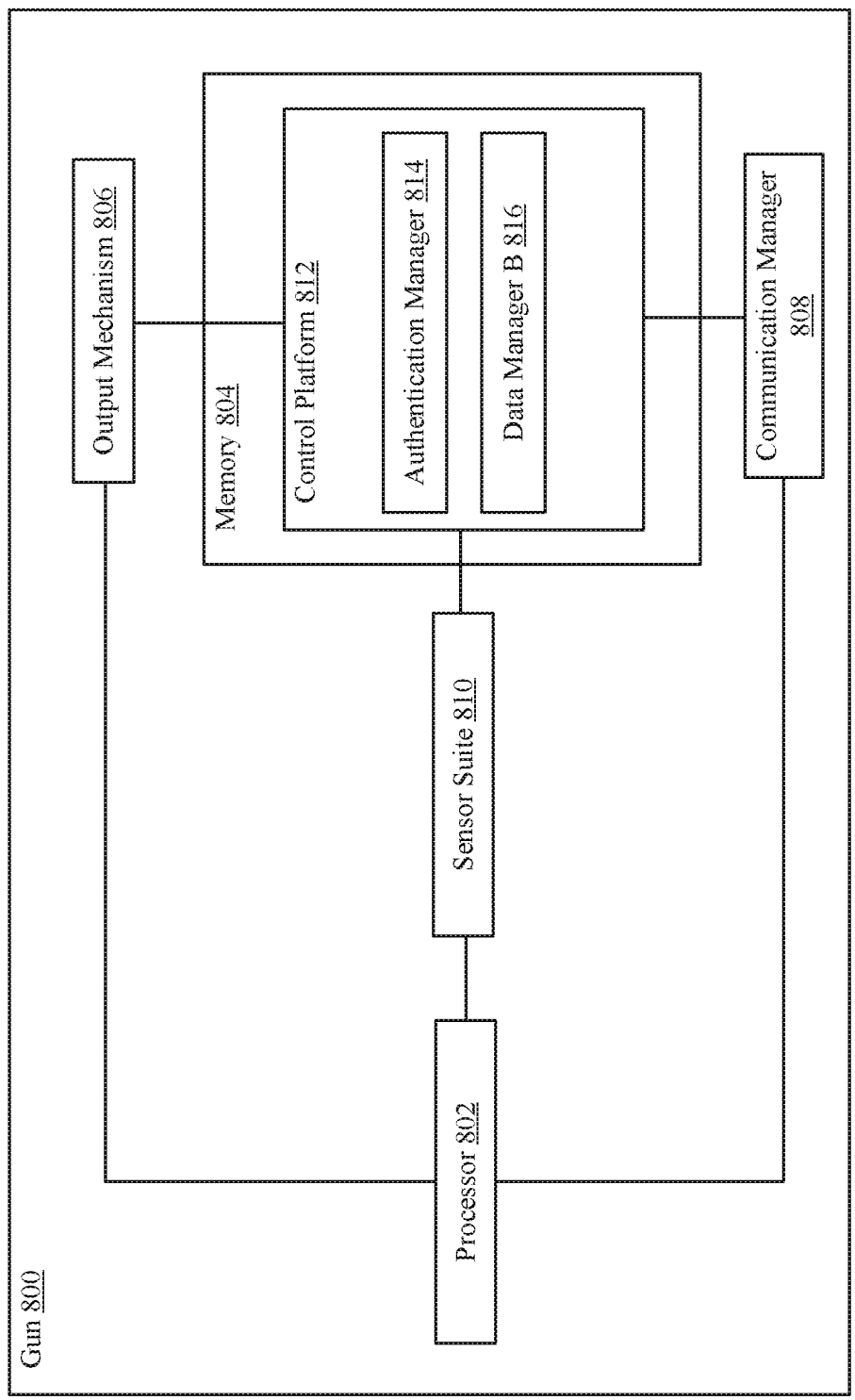
FIG. 8 illustrates an example of a gun that is able to implement a control platform.

FIG. 8 illustrates an example of a gun 800 that is able to implement a control platform 812 designed to produce outputs that are helpful for incident reports. As further discussed below, the control platform 812 (also referred to as a "management platform" or a "incident manager") may be designed to collect data for use in an incident report.

In some embodiments, the control platform 812 is embodied as a computer program that is executed by the gun 800. In other embodiments, the control platform 812 is embodied as an electrical circuit that performs logical operations of the gun 800. In yet other embodiments, the control platform 812 is embodied as a computer program that is executed by a computing device to which the gun 800 is communicatively connected. In such embodiments, the gun 800 may transmit relevant information to the computing device for processing as further discussed below. Those skilled in the art will recognize that aspects of the computer program could also be distributed amongst the gun 800 and computing device.

The gun 800 can include a processor 802, memory 804, output mechanism 806, and communication manager 808. The processor 802 can have generic characteristics similar to general-purpose processors, or the processor 802 may be an application-specific integrated circuit (ASIC) that provides control functions to the gun 800. As shown in FIG. 8, the processor 802 can be coupled with all components of the gun 800, either directly or indirectly, for communication purposes.

The memory 804 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 802, the memory 804 can also store data generated by the processor 802 (e.g., when executing the managers of the control platform 812). Note that the memory 804 is merely an abstract representation of a storage environment. The memory 804 could be comprised of actual memory chips or managers.

The output mechanism 806 can be any component that is capable of conveying information to a user of the gun 800. For example, the output mechanism 806 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 800. Thus, the display may indicate whether the gun 800 is presently in a locked state, unlocked state, etc. As another example, the output mechanism 806 may be a loudspeaker (or simply "speaker") that is able to audibly convey information to the user.

The communication manager 808 may be responsible for managing communications between the components of the gun 800. Additionally or alternatively, the communication manager 808 may be responsible for managing communications with computing devices that are external to the gun 800. Examples of computing devices include mobile phones, tablet computers, wearable electronic devices (e.g., fitness trackers), and network-accessible server systems comprised of computer servers. Accordingly, the communication manager 808 may be wireless communication circuitry that is able to establish communication channels with computing devices. Examples of wireless communication circuitry include integrated circuits (also referred to as "chips") configured for Bluetooth, Wi-Fi®, NFC, and the like.

Sensors are normally implemented in the gun 800. Collectively, these sensors may be referred to as the "sensor suite" 810 of the gun 800. For example, the gun 800 may include a motion sensor whose output is indicative of motion of the gun 800 as a whole. Examples of motion sensors include multi-axis accelerometers and gyroscopes. As another example, the gun 800 may include a proximity sensor whose output is indicative of proximity of the gun 800 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the gun 800 may include a fingerprint sensor or camera that generates images which can be used for, for example, biometric authentication. As shown in FIG. 8, outputs produced by the sensor suite 810 may be provided to the control platform 812 for examination or analysis.

For convenience, the control platform 812 may be referred to as a computer program that resides in the memory 804. However, the control platform 812 could be comprised of software, firmware, or hardware components that are implemented in, or accessible to, the gun 800. In accordance with embodiments described herein, the control platform 812 may include an authentication manager 814 and a data manager 816. As an illustrative example, the authentication manager 814 may process data generated by, and obtained from, a biometric sensor, and the data manager 816 may perform cryptographic procedures on data. Because the data obtained by these managers may have different formats, structures, and content, the instructions executed by these managers can (and often will) be different. For example, the instructions executed by the authentication manager 814 to process data generated by a biometric sensor may be different than the instructions generated by the data manager 816 to perform cryptographic procedures. As a specific example, the authentication manager 814 may implement image processing algorithms (e.g., for denoising, despeckling, etc.) that are not necessary for using a cryptographic key to transform plain-text data into cipher-text data.

Figure 9:
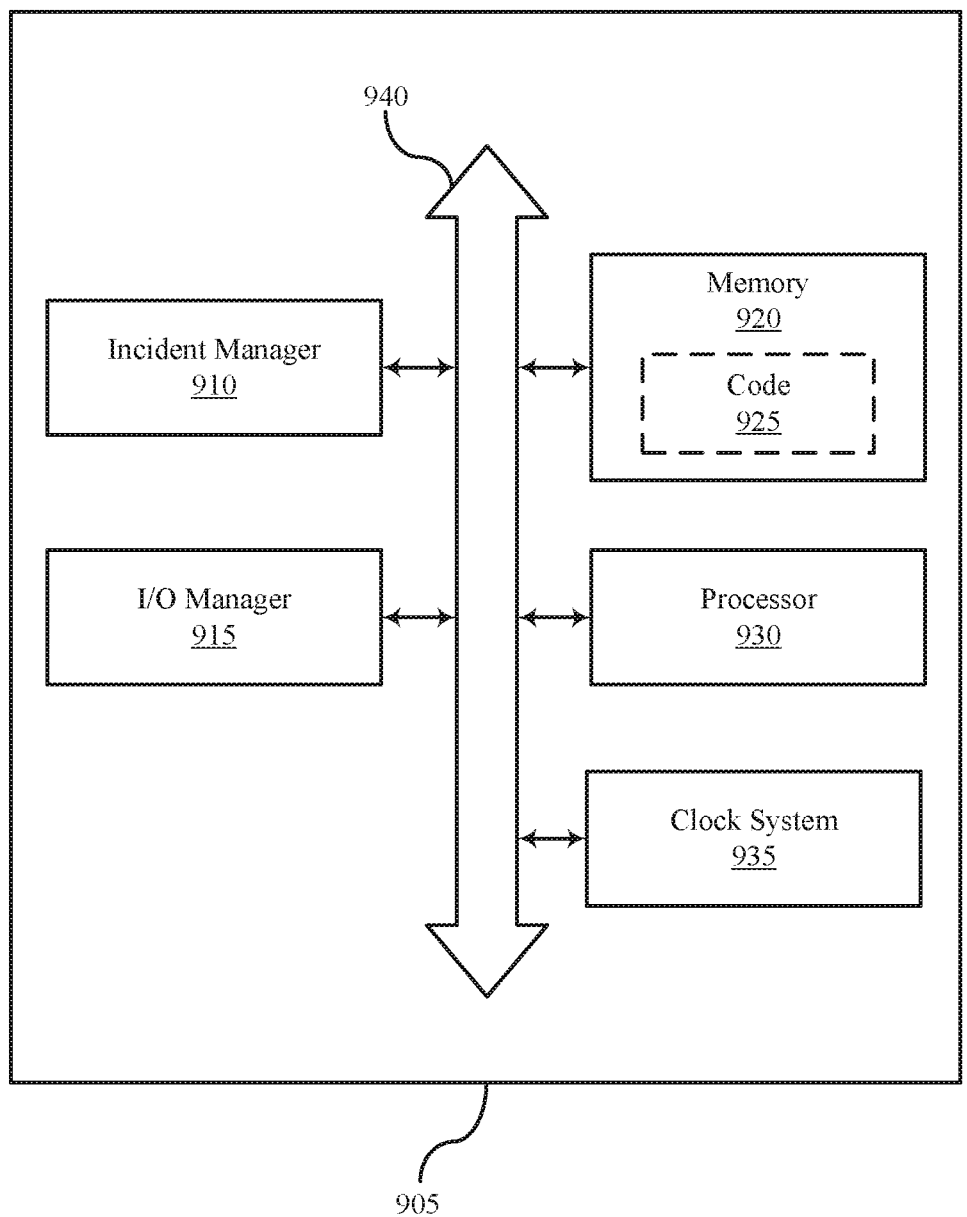
FIG. 9 illustrates an example of a system that supports generating incident reports.

FIG. 9 illustrates an example of a system 900 that supports generating incident reports. The device 905 may be operable to implement the techniques, technology, or systems disclosed herein. The device 905 may include components such as an incident manager 910, an input/output (I/O) manager 915, memory 920, code 925, a processor 930, a clock system 935, and a bus 940. The components of the device 905 may communicate via one or more buses 940. The device 905 may be an example of, or include components of, a data collection device, an accelerometer, a GPS device, or the like.

The incident manager 910 may receive data including multiple data fields, where a first data field contains a first data value uniquely identifying a gun and wherein a second data field contains a second data value identifying a gunshot, process the data to determine i) a location of the gunshot event and ii) a time of the gunshot, generate an incident report in response to the processing the data, where the incident report indicates a use of force incident, the location of the gunshot, and the time of the gunshot, encrypt the incident report using an encryption key to produce an encrypted version of the incident report, and cause the encrypted version of the incident report to be stored in a database.

The incident manager 910 may obtain data associated with a gun incident and generate an incident report based on the data. The incident manager 910 may process the data to identify a data value that uniquely identifies a data collection device used to generate the data, and the incident report may include the data value that uniquely identifies the data collection device. The incident manager 910 may process the data to identify a second data value that uniquely identifies an operator (e.g., a police officer, a security officer, etc.) assigned to the data collection device, and the incident report may include the second data value that uniquely identifies the data collection device. The incident manager 910 may retrieve camera footage (e.g., footage from a body worn camera) associated with the incident, and the incident manager 910 may include the camera footage in the incident report. In some examples, the incident manager 910 may include the camera footage in the incident report when an administrator has selected a component (e.g., a widget) of a user-interface, and the incident manager 910 may exclude the camera footage from the incident report when the administrator has not selected the component of the user-interface.

The I/O manager 915 may manage input and output signals for the device 905. The I/O manager 915 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 920 may include or store code (e.g., software) 925. The memory 920 may include volatile memory, such as random-access memory (RAM) and/or non-volatile memory, such as read-only memory (ROM). The code 925 may be computer-readable and computer-executable, and when executed, the code 925 may cause the processor 930 to perform various operations or functions described here.

The processor 930 may be an example or component of a central processing unit (CPU), an application specific integrated circuit (ASIC), or a field programmable gate array (FPGA). In some embodiments, the processor 930 may utilize an operating system or software such as Microsoft Windows®, iOS®, Android®, Linux®, Unix®, or the like. The clock system 935 can control a timer for use by the disclosed embodiments.

The incident manager 910, or its sub-components, may be implemented in hardware, software (e.g., software or firmware) executed by a processor, or a combination thereof. The incident manager 910, or its sub-components, may be physically located in various positions. For example, in some cases, the incident manager 910, or its sub-components may be distributed such that portions of functions are implemented at different physical locations by one or more physical components.

Figure 10:
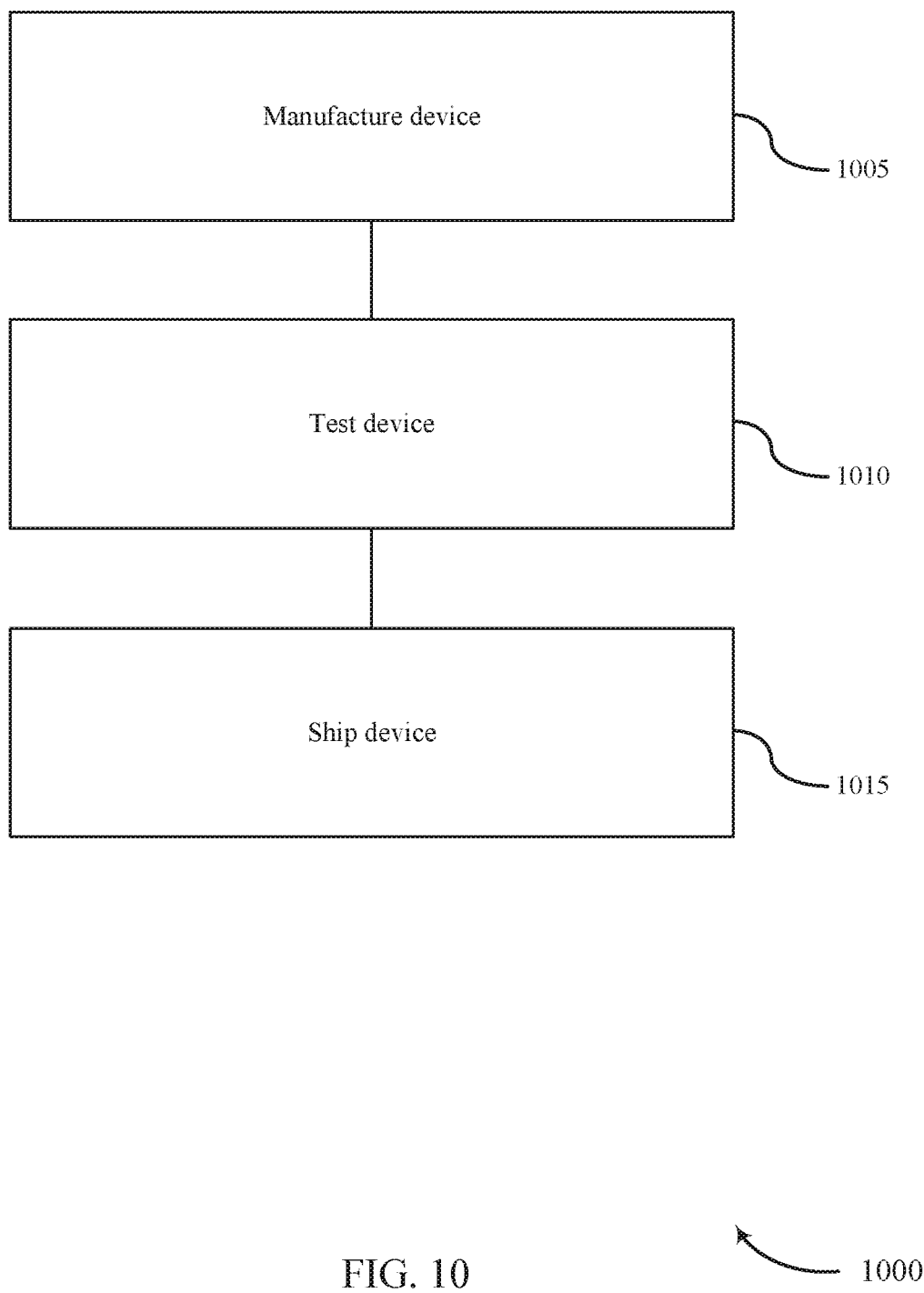
FIG. 10 illustrates an example of a flowchart showing a method of manufacturing a data collection device.

FIG. 10 illustrates an example of a flowchart 1000 showing a method of manufacturing a device that supports collecting incident data. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a manufacturer may manufacture a device that is able to implement aspects of the present disclosure (step 1005). The device may be an example of a data collection device, such as gun with electronic components or an electronic component that is able to be affixed to a gun. In some examples, the device may be an example of a data collection device. For example, the manufacturer may machine, cut, shape, or otherwise make parts to be included in the device. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the device from components produced entirely by the manufacturer, components produced by other entities, or a combination thereof. Often, the manufacturer will obtain some parts and make other parts that are assembled together to form the device (or a component of the device). The manufacturer or another entity may generate, store, deploy, or otherwise manage cryptographic data associated with a device. For example, the manufacturer may deploy a cryptographic secret (e.g., a cryptographic key for symmetric cryptographic procedures) into a memory component of the device to support encryption and decryption at the device, the manufacturer may deploy a public key into the memory component of the device to support verifying cryptographic signatures, or the manufacturer may deploy a digital certificate into the memory component of the device to demonstrate that the signature was created based on the private key associated with the public key, thereby suggesting the authenticity of the public key.

In some embodiments, the manufacturer also generates identifying information related to the device. For example, the manufacturer may etch (e.g., mechanically or chemically), engrave, or otherwise append identifying information onto the device itself. As another example, the manufacturer may encode at least some identifying information into a data structure that is associated with the device. For instance, the manufacturer may etch a serial number onto the device, and the manufacturer may also populate the serial number (and other identifying information) into a data structure for recording or tracking purposes. Examples of identifying information include the make of the device, the model of the device, the serial number, an officer assigned to the device, or the like. In some cases, the manufacturer may record a limited amount of identifying information (e.g., only the serial number), while in other cases the manufacturer may record a larger amount of identifying information.

The manufacturer may then test the device (step 1010). In some embodiments, the manufacturer tests all of the devices that are manufactured. In other embodiments, the manufacturer tests a subset of the devices that are manufactured. For example, the manufacturer may randomly or semi-randomly select devices for testing, or the manufacturer may select devices for testing in accordance with a predefined pattern (e.g., one test per 5 devices, 10 devices, or 100 devices). Moreover, the manufacturer may test the device in its entirety, or the manufacturer may test a subset of its components. For example, the manufacturer may test the component(s) that it manufactures. As another example, the manufacturer may test newly designed components or randomly selected components. Thus, the manufacturer could test select component(s) of the device, or the manufacturer could test the device as a whole. For example, the manufacturer may test at attachment mechanism designed to affix the device to a gun to verify that it satisfies a coupling threshold. As another example, the manufacturer may test a group of devices (e.g., all devices manufactured during an interval of time, devices selected at random over an interval of time, etc.) to ensure that those devices perform during and subsequent exposure to contaminants, such as water, solvents, soot, etc.

Thereafter, the manufacturer may ship the device to a dealer (step 1015). In the event that the device is a firearm, the manufacturer may ship the device to a Federal Firearms Licensed (FFL) dealer. For example, a purchaser (also referred to as a "customer") may purchase the device through a digital channel or non-digital channel. Examples of digital channels include web browsers, mobile applications, and desktop applications, while examples of non-digital channels include ordering via the telephone and ordering via a physical storefront. In such a scenario, the firearm may be shipped to the FFL dealer so that the purchaser can obtain the firearm from the FFL dealer. The FFL dealer may be directly or indirectly associated with the manufacturer of the firearm. For example, the FFL dealer may be a representative of the manufacturer, or the FFL dealer may sell and distribute firearms on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the device, and therefore perform multiple iterations of steps 1005 and 1010 either sequentially or simultaneously (e.g., one component may be tested while another component is added to the device). Thus, the descriptions of these processes are intended to be open ended.

Figure 11:
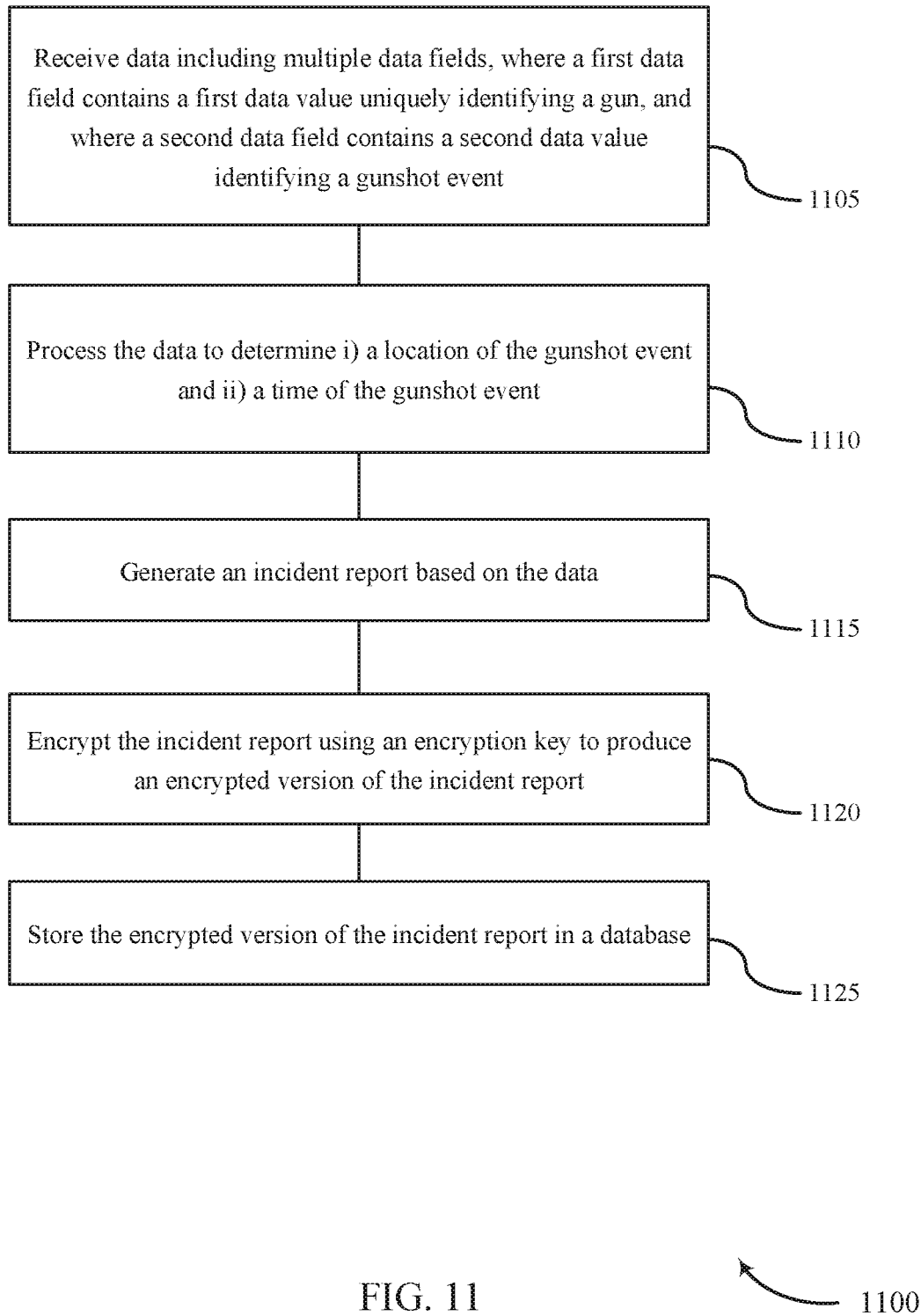
FIG. 11 illustrates a flowchart showing an example of a method of generating an incident report.

FIG. 11 illustrates a flowchart showing an example of a method 1100 of generating an incident report. The operations of the method 1100 may be implemented by a gun or its components as described herein. For example, the operations of the method 1100 may be performed by a remote device, such as a computer, a tablet, a smartphone, a server, a processor, or the like. In some examples, a remote device may execute a set of instructions to control the functional elements of the remote device to perform the described functions. Additionally or alternatively, the remote device may perform aspects of the described functions using special-purpose hardware.

At step 1105, a remote device may receive data including multiple data fields, where a first data field contains a first data value uniquely identifying a gun, and where a second data field contains a second data value identifying a gunshot event. In some examples, the first data value may indicate the serial number of the gun, and the second data value may indicate the type of incident for which an incident report is being generated.

At step 1110, the remote device may process the data to determine i) a location of the gunshot event and ii) a time of the gunshot event. The location of the gunshot event may be indicated via GPS coordinates, a mailing address, a geographic sector, or the like. The time of the gunshot event may be indicated via a timestamp, a time of day, a date, or the like.

At step 1115, the remote device may generate the incident report based on the data, where the incident report indicates a use of force incident, the location of the gunshot event, and the time of the gunshot event. The incident report may be generated in response to user-input indicating that the incident report or to be generated, or the incident report may be generated automatically based on a schedule or in response to the remote device determining that the type of incident (e.g., a gunshot event) satisfies an incident report generation rule. The rule may indicate that an incident report is to be generated for any incident of a certain type, such as use of force incidents.

At step 1120, the remote device may encrypt the incident report using an encryption key to produce an encrypted version of the incident report.

At step 1125, the remote device may store the encrypted version of the incident report in a database. In some examples, the encrypted version of the incident report may be stored in memory of the remote device, while in other examples, the encrypted version of the incident report may be stored in a memory of another device, such as a remote data store.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 12:
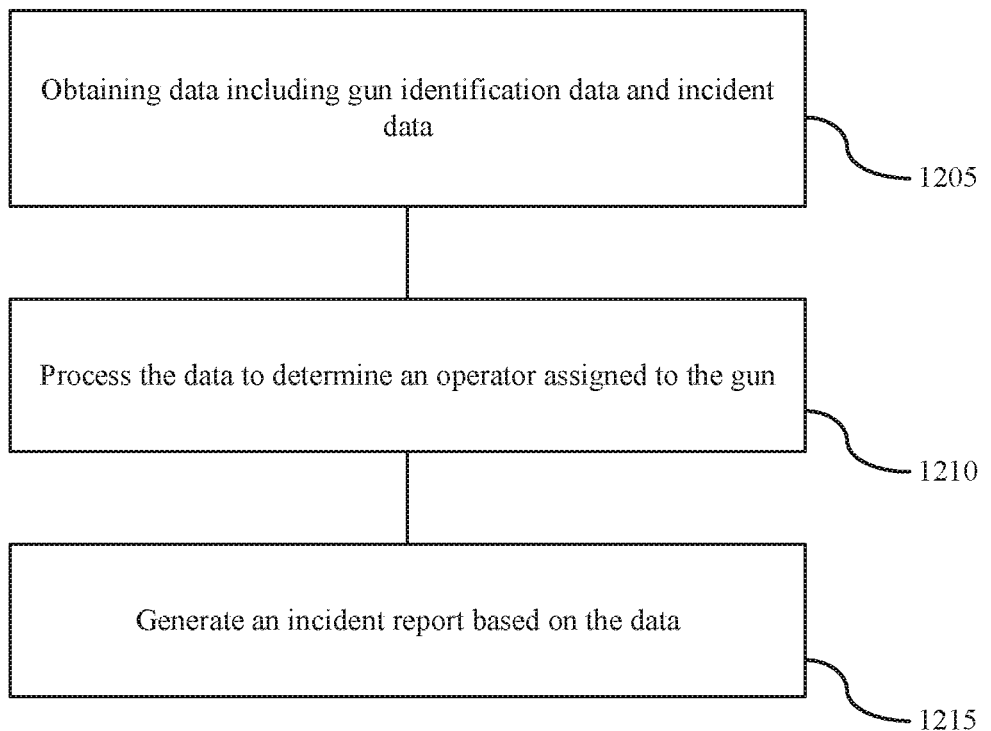
FIG. 12 illustrates a flowchart showing an example of a method of generating an incident report.

FIG. 12 illustrates a flowchart showing an example of a method 1200 of generating an incident report. The operations of the method 1200 may be implemented by a gun or its components as described herein. For example, the operations of the method 1200 may be performed by a remote device, such as a computer, a tablet, a smartphone, a server, a processor, or the like. In some examples, a remote device may execute a set of instructions to control the functional elements of the remote device to perform the described functions. Additionally or alternatively, the remote device may perform aspects of the described functions using special-purpose hardware.

At step 1205, the remote device may obtain data including gun identification data and incident data. The remote device may obtain the data from a data collection device, and the gun identification data may uniquely identify a gun, and the incident data may indicate a type of incident. For example, the gun identification data may include a serial number of the gun, and the incident data may indicate that the type of law enforcement response incident. Examples of law enforcement response incidents include use of force, use of less-lethal force, use of lethal force, domestic dispute, theft, etc.

At step 1210, the remote device may process the data to determine an operator assigned to the gun. The remote device may determine the operator assigned to the gun based on an operator assignment procedure. Examples of operator assignment procedures include an administrator assigning the operator to the gun via a user-interface of a computer program, the operator a entering a personal identification number into the gun or a computer, the operator enrolling biometric data, or the like.

At step 1215, the remote device may generate the incident report based on the data. In some examples, the incident report indicates the type of incident and the operator assigned to the gun. The incident report may also indicate a location of the incident, a location of the operator, the location of the gun, the time of the incident, other individuals involved in the incident, or any combination thereof.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
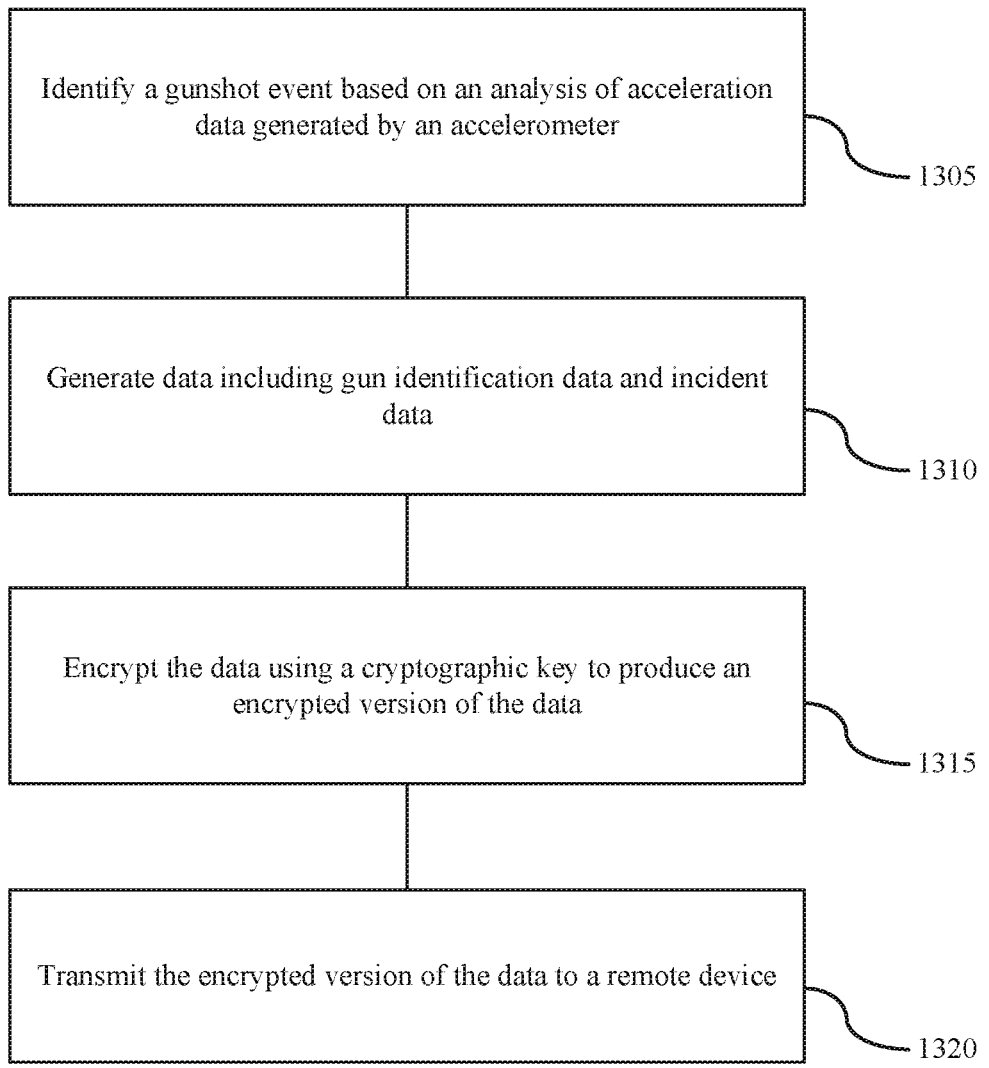
FIG. 13 illustrates a flowchart showing an example of a method of collecting data for an incident report.

FIG. 13 illustrates a flowchart showing an example of a method 1300 of collecting data for an incident report. The operations of the method 1300 may be implemented by a data collection device or its components as described herein. For example, the operations of the method 1300 may be performed by a data collection device, such as a processor, an integrated circuit, a controller, or the like. In some examples, a data collection device may execute a set of instructions to control the functional elements of the data collection device to perform the described functions. Additionally or alternatively, the data collection device may perform aspects of the described functions using special-purpose hardware.

At step 1305, the data collection device may identify a gunshot event based on an analysis of acceleration data generated by an accelerometer. The data collection device may identify the gunshot event in response to determining that an acceleration value of the acceleration data is greater than an acceleration threshold. In some examples, the acceleration value may be measured along a predetermined axis.

At step 1310, the data collection device may generate data including gun identification data and incident data. The gun incident data may uniquely identify the gun, and the incident data may include information about the gunshot event. For example, the incident data may include the location of the gunshot event, the location of the gun, the operator assigned to the gun, or the like. In some other examples, incident data may include information such as where an arrest took place, where a fight took place, the number of operators or officers involved in an incident, or the like.

At step 1315, the data collection device may encrypt the data using a cryptographic key to produce an encrypted version of the data.

At step 1320, the data collection device may transmit the encrypted version of the data to a remote device. The data collection device may perform a cryptographic handshake procedure to verify the identity of the remote device. As an example, the data collection device may communicate with the remote device according to the Challenge-Handshake Authentication Protocol (CHAP).

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method of generating an incident report, the method including: receiving data including multiple data fields, wherein a first data field contains a first data value uniquely identifying a gun, and wherein a second data field contains a second data value identifying a gunshot event; processing the data to determine i) a location of the gunshot event and ii) a time of the gunshot event; generating the incident report based on the data, wherein the incident report indicates a use of force incident, the location of the gunshot event, and the time of the gunshot event; encrypting the incident report using an encryption key to produce an encrypted version of the incident report; and storing the encrypted version of the incident report in a database.

In some examples, the techniques described herein relate to a method of generating an incident report, the method including: obtaining, from a data collection device, data including gun identification data and incident data, wherein the gun identification data uniquely identifies a gun, and wherein the incident data indicates a type of incident; processing the data to determine, based on the gun identification data, an operator assigned to the gun; and generating the incident report based on the data, wherein the incident report indicates the type of incident and the operator assigned to the gun.

In some examples, the techniques described herein relate to a method, wherein the incident data includes multiple events that are each associated with a timestamp indicating when a respective event took place, and wherein the incident report presents the multiple events in chronological order based on the timestamps.

In some examples, the techniques described herein relate to a method, further including: transmitting a query to a database, wherein the query is designed to identify one or more operators associated with the incident; identifying, based on a response to the query, an additional operator associated with the incident; and obtaining, from an additional data collection device that is assigned to the additional operator, additional data including additional gun identification data and additional incident data, wherein the incident report indicates the additional operator.

In some examples, the techniques described herein relate to a method, wherein the incident data includes multiple events that are each associated with a timestamp indicating when a respective event took place, the method further including: obtaining, from an additional data collection device, additional data including additional gun identification data and additional incident data, wherein the additional gun identification data uniquely identifies an additional gun, wherein the additional incident data indicates the type of incident, and wherein the additional incident data includes multiple events that are each associated with a timestamp indicating when a respective event took place; and sorting the multiple events from both the incident data and the additional incident data, wherein the multiple events are sorted based on the associated timestamps, and wherein the incident report presents the multiple events in chronological order based on the timestamps.

In some examples, the techniques described herein relate to a method, wherein the incident data includes global positioning system data indicating a location of the incident, and wherein the incident report indicates the location of the incident.

In some examples, the techniques described herein relate to a method, further including: receiving user-input indicating a selection of the incident, wherein the generating the incident report is in response to the user-input.

In some examples, the techniques described herein relate to a method, further including: receiving user-input indicating a selection of multiple incidents, wherein the generating the incident report is in response to the user-input, and wherein the incident report includes information associated with the multiple incidents.

In some examples, the techniques described herein relate to a method, further including: using a cryptographic key to encrypt the data and produce an encrypted version of the data, wherein the incident report includes the encrypted version of the data.

In some examples, the techniques described herein relate to a method, wherein the obtaining the data further includes: receiving the data from the data collection device over a radio frequency spectrum band.

In some examples, the techniques described herein relate to a method of collecting data for an incident report, the method including: identifying, at a data collection device, a gunshot event based on an analysis of acceleration data generated by an accelerometer, wherein a data value of the acceleration data satisfies an acceleration threshold; generating data including gun identification data and incident data, wherein the gun identification data uniquely identifies a gun, and wherein the incident data contains a timestamp indicating a time at which the gunshot event occurred; encrypting the data using a cryptographic key to produce an encrypted version of the data; and transmitting the encrypted version of the data to a remote device.

In some examples, the techniques described herein relate to a method, further including: determining a location of the data collection device at the time at which the gunshot event occurred, wherein the data further includes an indication of the location.

In some examples, the techniques described herein relate to a method, further including: determining an operator that was in possession of the data collection device at the time at which the gunshot event occurred, wherein the data further includes an indication of the operator.

In some examples, the techniques described herein relate to a method, further including: performing an operator assignment procedure to assign the operator to the data collection device, wherein the determining the operator is based on the operator assignment procedure.

In some examples, the techniques described herein relate to a method, wherein the operator assignment procedure includes: providing user-input to a user-interface, wherein the user-input associates the operator with the data collection device.

In some examples, the techniques described herein relate to a method, wherein the operator assignment procedure includes: enrolling biometric data of the operator on a gun, wherein the data collection device is part of the gun, or wherein the data collection device is designed to be affixed to the gun.

In some examples, the techniques described herein relate to a method, further including: storing the encrypted version of the data in memory of the data collection device.

In some examples, the techniques described herein relate to a method, further including: generating a digital signature using an additional cryptographic key; and transmitting the digital signature to the remote device.

In some examples, the techniques described herein relate to a method, further including: obtaining, from a keypad of the data collection device, a personal identification number, wherein the personal identification number includes alphanumeric characters; and performing, based on the personal identification number, an operator assignment procedure to assign an operator to the data collection device.

In some examples, the techniques described herein relate to a method, further including: determining, based on the operator assignment procedure, the operator in possession of the data collection device, wherein the data includes an indication of the operator.

Remarks

The Detailed Description provided herein, in connection with the drawings, describes example configurations and does not represent all the examples that may be implemented or that are within the scope of the claims. The term "example" used herein means "serving as an illustration or instance," and not "a preferred example."

The functions described herein may be implemented with a controller. A controller may include an incident manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of generating an incident report, the method comprising:
    receiving data including multiple data fields, wherein a first data field contains a first data value uniquely identifying a gun, and wherein a second data field contains a second data value identifying a gunshot event;
    processing the data to determine i) a location of the gunshot event and ii) a time of the gunshot event;
    generating the incident report based on the data, wherein the incident report indicates a use of force incident, the location of the gunshot event, and the time of the gunshot event;
    encrypting the incident report using an encryption key to produce an encrypted version of the incident report; and
    storing the encrypted version of the incident report in a database.

2. A method of generating an incident report, the method comprising:
    obtaining, from a data collection device, data including gun identification data and incident data, wherein the gun identification data uniquely identifies a gun, and wherein the incident data indicates a type of incident;
    processing the data to determine, based on the gun identification data, an operator assigned to the gun; and
    generating the incident report based on the data, wherein the incident report indicates the type of incident and the operator assigned to the gun.

3. The method of claim 2, wherein the incident data includes multiple events that are each associated with a timestamp indicating when a respective event took place, and wherein the incident report presents the multiple events in chronological order based on the timestamps.

4. The method of claim 2, further comprising:
    transmitting a query to a database, wherein the query is designed to identify one or more operators associated with the incident;

identifying, based on a response to the query, an additional operator associated with the incident; and obtaining, from an additional data collection device that is assigned to the additional operator, additional data including additional gun identification data and additional incident data, wherein the incident report indicates the additional operator.

5. The method of claim 2, wherein the incident data includes multiple events that are each associated with a timestamp indicating when a respective event took place, the method further comprising:

obtaining, from an additional data collection device, additional data including additional gun identification data and additional incident data, wherein the additional gun identification data uniquely identifies an additional gun, wherein the additional incident data indicates the type of incident, and wherein the additional incident data includes multiple events that are each associated with a timestamp indicating when a respective event took place; and sorting the multiple events from both the incident data and the additional incident data, wherein the multiple events are sorted based on the associated timestamps, and wherein the incident report presents the multiple events in chronological order based on the timestamps.

6. The method of claim 2, wherein the incident data includes global positioning system data indicating a location of the incident, and wherein the incident report indicates the location of the incident.

7. The method of claim 2, further comprising:
receiving user-input indicating a selection of the incident, wherein the generating the incident report is in response to the user-input.

8. The method of claim 2, further comprising:
receiving user-input indicating a selection of multiple incidents, wherein the generating the incident report is in response to the user-input, and wherein the incident report includes information associated with the multiple incidents.

9. The method of claim 2, further comprising:
using a cryptographic key to encrypt the data and produce an encrypted version of the data, wherein the incident report includes the encrypted version of the data.

10. The method of claim 2, wherein the obtaining the data further includes:
receiving the data from the data collection device over a radio frequency spectrum band.

11. A method of collecting data for an incident report, the method comprising:
identifying, at a data collection device, a gunshot event based on an analysis of acceleration data generated by an accelerometer, wherein a data value of the acceleration data satisfies an acceleration threshold;

generating data including gun identification data and incident data, wherein the gun identification data uniquely identifies a gun, and wherein the incident data contains a timestamp indicating a time at which the gunshot event occurred;

encrypting the data using a cryptographic key to produce an encrypted version of the data; and transmitting the encrypted version of the data to a remote device.

12. The method of claim 11, further comprising:
determining a location of the data collection device at the time at which the gunshot event occurred, wherein the data further includes an indication of the location.

13. The method of claim 11, further comprising:
determining an operator that was in possession of the data collection device at the time at which the gunshot event occurred, wherein the data further includes an indication of the operator.

14. The method of claim 13, further comprising:
performing an operator assignment procedure to assign the operator to the data collection device, wherein the determining the operator is based on the operator assignment procedure.

15. The method of claim 14, wherein the operator assignment procedure includes:
providing user-input to a user-interface, wherein the user-input associates the operator with the data collection device.

16. The method of claim 14, wherein the operator assignment procedure includes:
enrolling biometric data of the operator on a gun, wherein the data collection device is part of the gun, or wherein the data collection device is designed to be affixed to the gun.

17. The method of claim 11, further comprising:
storing the encrypted version of the data in memory of the data collection device.

18. The method of claim 11, further comprising:
generating a digital signature using an additional cryptographic key; and
transmitting the digital signature to the remote device.

19. The method of claim 11, further comprising:
obtaining, from a keypad of the data collection device, a personal identification number, wherein the personal identification number includes alphanumeric characters; and
performing, based on the personal identification number, an operator assignment procedure to assign an operator to the data collection device.

20. The method of claim 19, further comprising:
determining, based on the operator assignment procedure, the operator in possession of the data collection device, wherein the data includes an indication of the operator.

* * * * *